Oct. 21, 1947.  M. H. WILBERT  2,429,300
SAW TOOTH GRINDER
Filed Oct. 15, 1945.  4 Sheets-Sheet 3
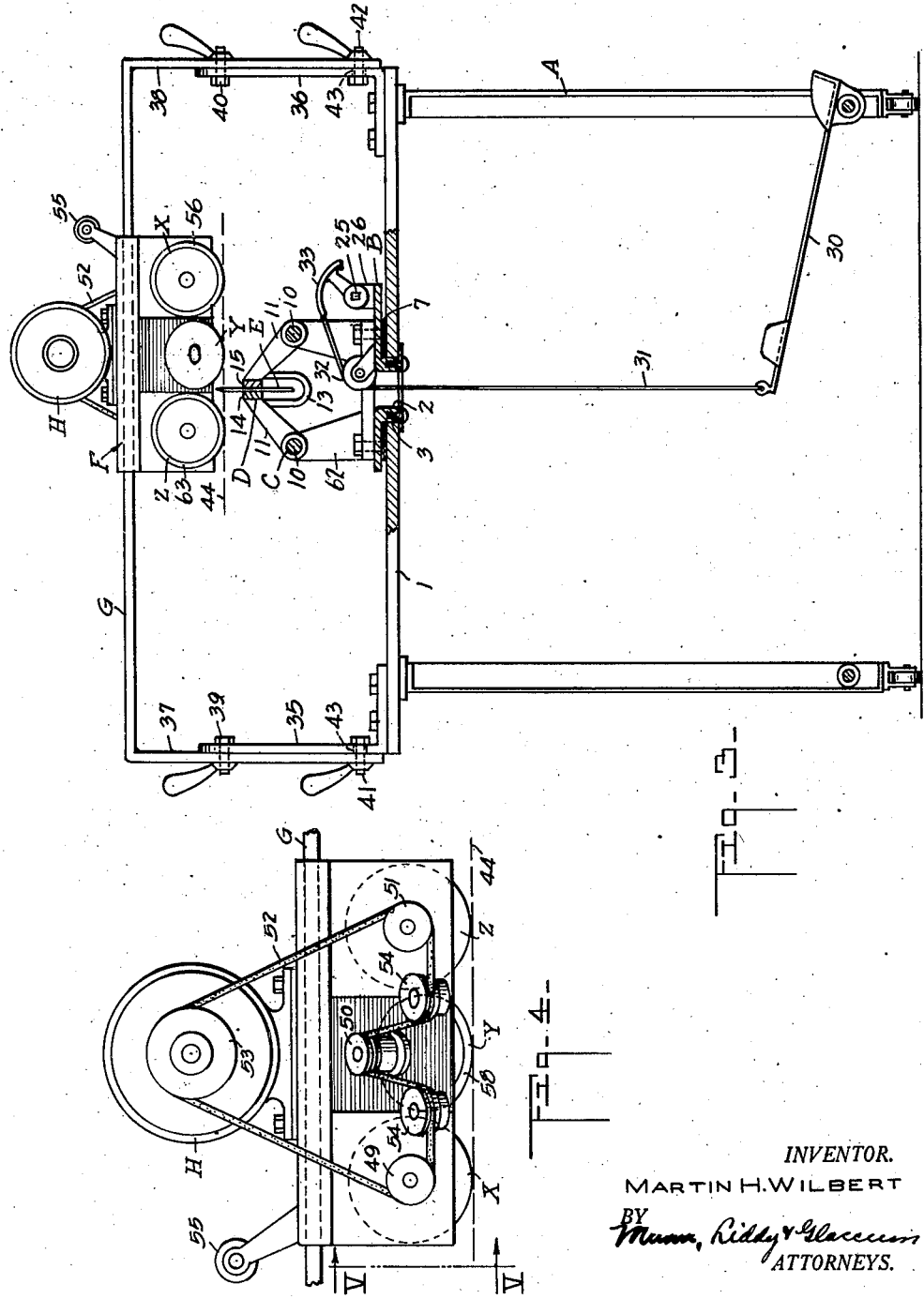
INVENTOR.
MARTIN H. WILBERT
BY
ATTORNEYS.

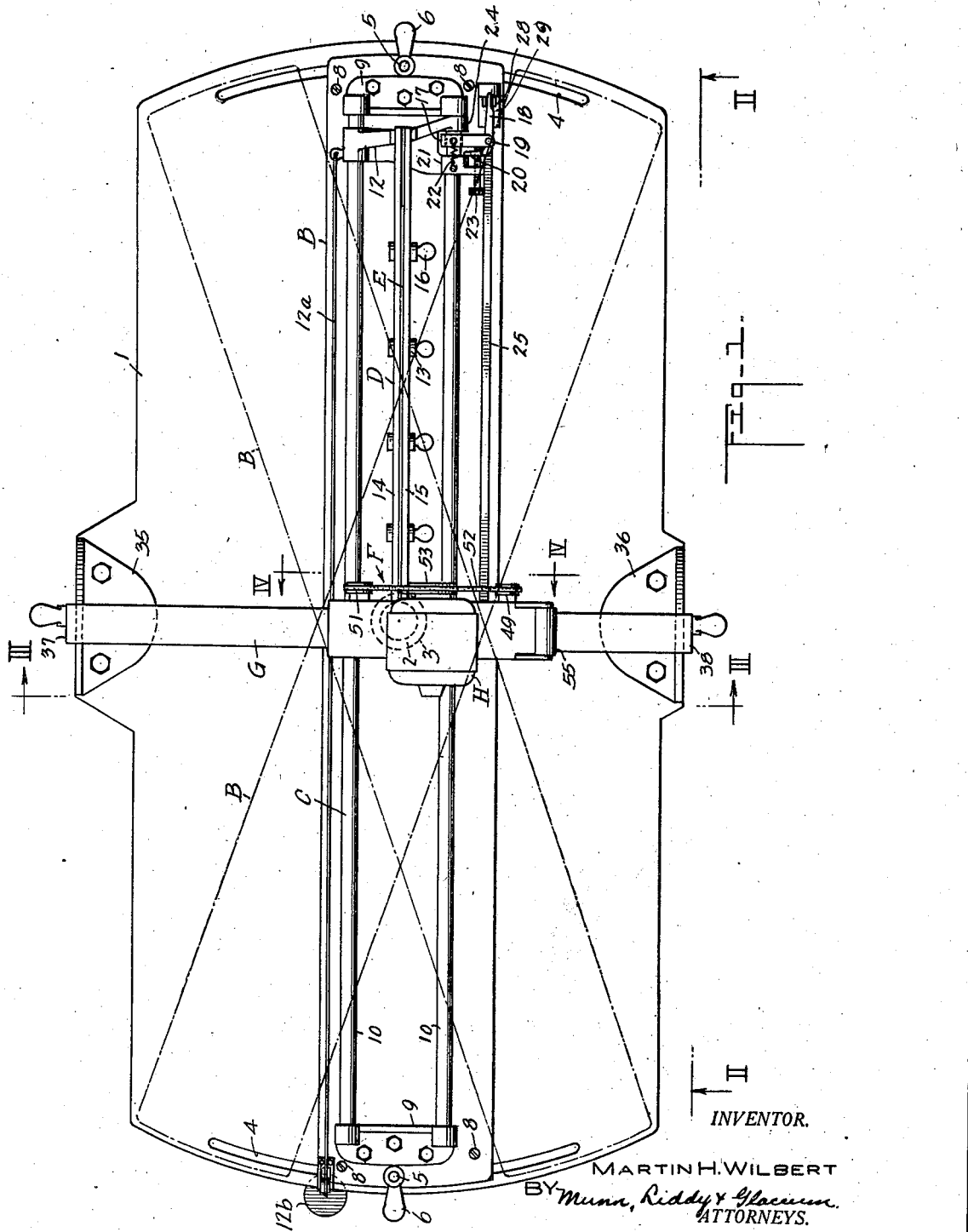

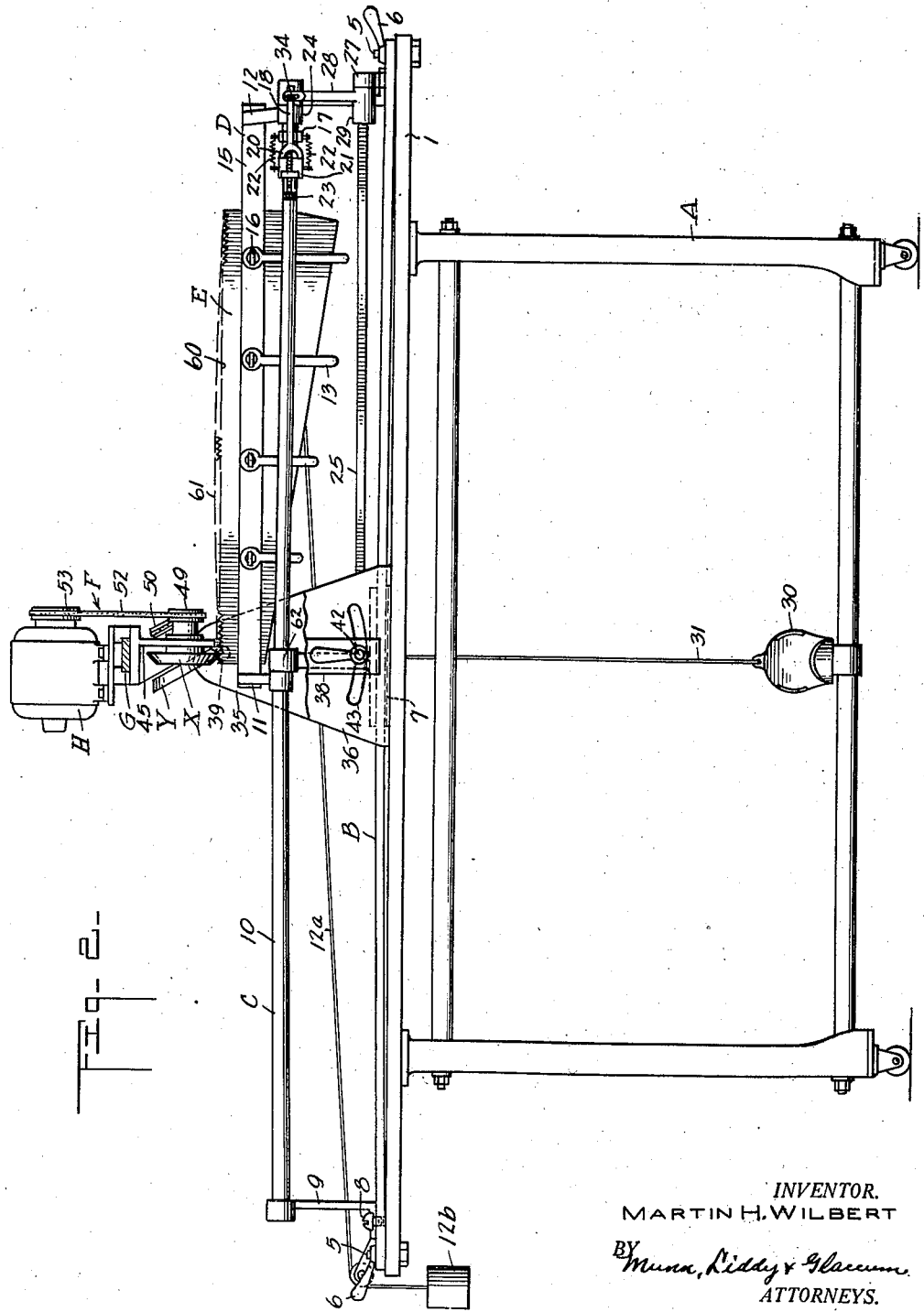

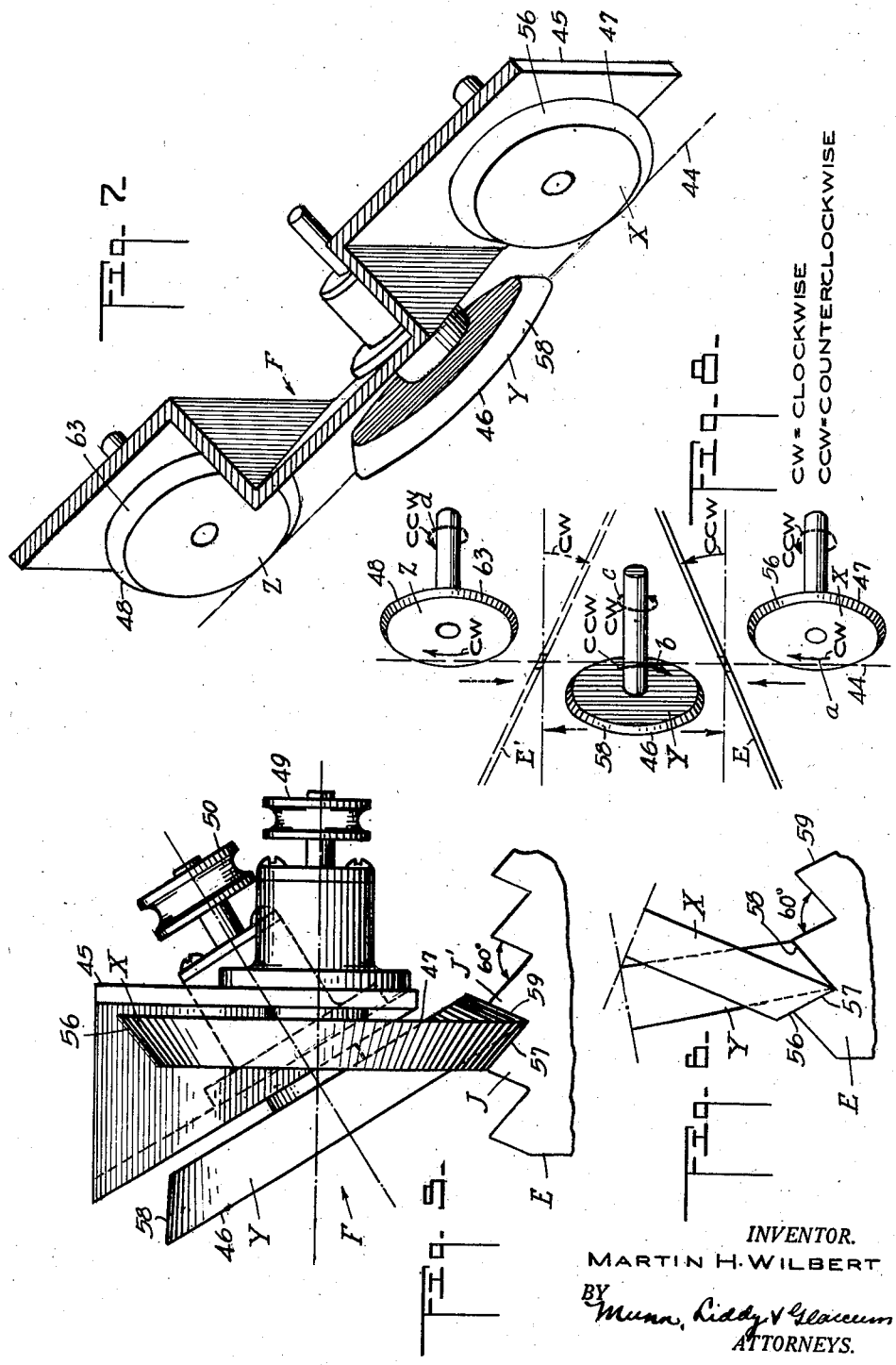

Patented Oct. 21, 1947

2,429,300

UNITED STATES PATENT OFFICE 2,429,300

SAW-TOOTH GRINDER

Martin H. Wilbert, San Bruno, Calif.

Application October 15, 1945, Serial No. 622,368

15 Claims. (Cl. 76—41)

An object of my invention is to provide a saw tooth grinder in which the grinding wheels will exert a grinding action with the grain of the saw blade rather than against the grain, whereby the saw tooth will be properly ground. In this specification where the phrase "grinding with the grain or against the grain," is used a proper definition follows: When the grinding wheel approaches the edge of material from behind the edge and contacts the material before it reaches the edge, the material is being ground with the grain—and vice versa; when the wheel approaches the edge from the space and touches the material first at the edge, then the grinding will be against the grain. This same definition applies when using a file; if the file is stroked towards the edge (being sharpened) you are filing with grain and vice versa; if you are filing across the edge towards the material, this is against the grain.

The prime object of this invention is to overcome the fault inherent in a file, since the file will only cut in one direction and as a result when you endeavor to sharpen a saw with a file you must contact one tooth with the grain and the adjacent tooth against the grain, the result being that the edge being filed with the grain cuts easily while the other edge on the adjacent tooth does not cut nice but chatters and does not form a sharp cutting edge nor produce sharp points on the tooth. The tendency is to file away the tooth being filed with the grain and promote unevenness of the teeth in the saw. I have corrected this situation by making a theoretical file which cuts with the grain on the forward stroke and on one face of the file; while the return stroke uses the other face of the file on the adjacent tooth and again cuts with the grain. We now have even cutting; sharp edges and points on the teeth and therefore even teeth. This action, through the use of multiple grinding wheels, will develop in detail in the specification.

A further object of my invention is to provide a device of the type described which makes use of the mechanism shown in my patent on a saw retoothing machine, No. 2,300,717, issued November 3, 1942. In the present case, the mechanism is employed for advancing the saw step-wise so that the teeth cut in the saw will be spaced at the proper intervals.

One of the novel features of my invention is to provide a device in which the grinding head is moved so that the grinding wheels will engage with the saw along a particular horizontal line that coincides with the roots of the teeth. In addition, the saw can be swung angularly in a horizontal plane with respect to the path taken by the grinding head and this angular swing is made about a vertical pivot line which passes through the same horizontal line mentioned. The swinging of the saw into different angular positions will cause the grinding wheels to give the proper bevel to the saw teeth.

Other objects and advantages will appear in the following specification, and the novel features of the device will be particularly pointed out in the appended claims.

My invention is illustrated in the accompanying drawings forming a part of this application, in which:

Figure 1 is a top plan view of the device;

Figure 2 is a front elevation of the device when looking in the direction of the arrows II—II of Figure 1;

Figure 3 is a transverse section taken along the line III—III of Figure 1;

Figure 4 is a view of the grinding head on an enlarged scale when looking in the direction of the arrows IV—IV of Figure 1;

Figure 5 is an end view of the grinder head on still a larger scale when looking in the direction of the arrows V—V of Figure 4;

Figure 6 is a schematic showing of how the grinding wheels contact with only one edge of a tooth at a time;

Figure 7 is an isometric view of the frame supporting the grinding wheels; and

Figure 8 is a schematic view showing how the saw is angularly positioned with respect to the line of movement taken by the grinding wheels so that the proper bevel will be ground on the teeth.

While I have shown only the preferred forms of my invention, it should be understood that various changes or modifications may be made within the scope of the appended claims without departing from the spirit and scope of the invention.

In carrying out my invention, I provide a frame indicated generally at A and this frame has a horizontal platform 1. On the platform 1, I mount an elongated saw supporting turntable B and Figure 3 illustrates how the center of the turntable has a cylindrical member 2 rotatably mounted in an opening 3 provided at the center of the platform 1. The turntable or saw supporting table may be swung into either one of two extreme positions shown by the dot and dash lines in Figure 1.

The platform is provided with arcuate slots 4 that receive clamping bolts 5 whose handles 6 may be tightened for clamping the turntable in the desired angular position. The ends of the slots 4 determine the limit of swing of the turntable. In Figure 3 I show shims 7 placed around the cylindrical member 2 and under the turntable for spacing the center of the turntable a predetermined distance above the adjacent portion of the platform 1. The purpose of this will be described hereinafter. In Figures 1 and 2 I show screws 8 in the turntable and adapted to be adjusted for contacting the top of the platform for spacing the ends of the turntable the desired distance above the platform. The ends of the turntable are held in position by the clamping bolts 5. This arrangement gives a slight arcuate bow in a vertical plane to the turntable throughout its length. The arc of the bow can be varied by adjusting the screws 8 for altering the height of the turntable ends with respect to the platform so that this height can be varied.

The turntable carries a saw set-up frame C. This frame has end brackets 9 secured to the ends of the turntable and these brackets carry elongated rods 10. The rods are supported at their centers by a center bracket. A traveling saw holder D has end brackets 11 and 12 slidably mounted on the rods 10 and Figure 3 shows how the travelling holder carries U-shaped saw-gripping members 13. In Figure 2 I illustrate how the saw gripping members 13 are supported by elongated jaws 14 and 15 and these jaws bear against opposite sides of a saw E. Clamping screws 16 force the jaws 14 and 15 toward each other for holding the saw in proper position.

The means for advancing the saw along the set-up frame makes use of the advancing mechanism shown in my patent above referred to. In Figure 1 I show how the end bracket 12 of the traveling holder D has a slip sleeve 17 mounted on one of the rods 10. A bell crank lever 18 is pivoted at 19 to an extension of the slip sleeve and an end 20 of the lever contacts with a portion 21 of the bracket 12. Springs 22 urge the slip sleeve to the left in Figure 1 and a set screw 23 limits this movement so that the sleeve 17 will be disposed a predetermined distance from the adjacent surface of the portion 21.

If now the lever 18 is swung in a counter-clockwise direction when looking at Figure 1, the slip sleeve 17 will bind upon the rod 10 and the end 20 of the lever will advance the bracket 12 until the portion 24 of the bracket contacts the slip sleeve. A cable 12a and counterweight 12b lock the saw carrier normally; but pull it along the guides when lever 18 acts on the other end of the slide bar. A freeing of the lever will permit the springs 22 to move the now freed slip sleeve forward along the rod 10 until the set screw 23 is again contacted. The distance between the slip sleeve and the portion 24 determines the advance of the traveling holder D each time the lever 18 is actuated. This distance is equivalent to the length of two saw teeth.

The lever may be actuated by any means desired, such as hydraulic, electrical, or mechanical. In the present showing, I make use of a mechanical means for operating the lever and this comprises a square shaft 25 that is mounted in bearings 26, see Figure 3, and 27, see Figure 2. An arm 28 has its free end bifurcated so as to receive the free end of the lever 18 and the arm has a bearing 29 with a square bore that slidably receives the square shaft 25.

The square shaft is rocked by means of a treadle 30, see Figure 3, a cord 31 connected to the turntable and passing over an idler pulley 32, and an arcuate member 33 that receives the end of the cord and is mounted on the square shaft 25. A downward movement of the treadle will cause the cord to rock the member 33, shaft 25 and arm 28 for actuating the advancing mechanism for the traveling saw holder D. The bifurcated end of the arm 28 is connected by a pin 34 to the lever 18, so that the arm will be step-wise advanced along the square rod with the holder.

I will now describe the means for supporting the grinding head indicated generally at F, in Figure 3. The platform 1 has brackets 35 and 36 placed at the center of the platform and these brackets pivotally carry what I term sliding ways G. The sliding ways consists of an inverted U-shaped member whose downwardly extending ends 37 and 38 are pivotally supported at 39 and 40 to the brackets 35 and 36. At the extremities of the ends 37 and 38 I mount clamping bolts 41 and 42 that slide in arcuate slots 43 provided in the brackets 35 and 36. The slots 43 permit the sliding ways to be swung about their pivots 39 and 40 into the desired angular position for a purpose hereinafter described and then it may be locked against further swinging movement. The pivots 39 and 40 constitute additional clamping bolts that may be tightened for rigidly securing the sliding ways in place.

It should be noted that the center line 44 passing through the pivots 39 and 40 also passes through the roots of the teeth which are to be formed on the saw. The grinding head F has three grinding wheels X, Y and Z, see Figure 3. The periphery of the wheels are beveled to not greater than a 45° angle and the lower edges of the wheels will coincide with the horizontal line 44. Figure 7 shows the frame 45 of the grinding head as being shaped for supporting the wheels X and Z in a vertical plane and the wheel Y in a plane that extends at an angle thereto. The bevelled edge 56 of the wheel X tangent to the line 44 will make an angle of 60° with the bottom of the bevelled edge 58 of the wheel Y also tangent to the line 44. The face 46 of the wheel Y extends at an angle to the faces 47 and 48 of the wheels X and Z that lie in the same plane.

In Figure 4, I show how the wheels are rotated by means of a motor H. The wheels X, Y and Z have pulleys 49, 50 and 51, respectively, and these pulleys have a belt 52 passed therearound and also around a motor pulley 53. Idler pulleys 54 are placed between the pulleys 49 and 50, and the pulleys 50 and 51, so that the same belt can rotate the three pulleys even though the axis of the pulley Y extends at an angle to the axes of the pulleys X and Z. A hand grip 55 is used for moving the grinding head along the slide ways G.

From the foregoing description of the various parts of the device, the operation thereof may be readily understood.

In setting up the saw E in the vise bars 13, a gage, not shown, is used so that the roots of the teeth to be ground in the saw lie in a line that passes through the line 44 shown in Figure 3. This assures the operator that the teeth will be properly ground on the saw. The line 44 is indicated in Figure 8 and this figure schematically shows the angular position of the saw with respect to the wheels X, Y and Z during the grinding operation. The turntable B is swung in a counter-clockwise direction into the dot-dash line position shown in Figure 1 when the wheels X and Y are used for grinding the teeth. The angular position of the saw shown in Figure 8 as it lies between the wheels X and Y will cause the wheels to grind the correct bevel on the teeth. In Figure 5, the wheel X is shown with its bevel edge 56 grinding the back 57 of a saw tooth J. The grinding head is moved for bringing the wheel X into contact with the edge 57 when the rotation of the wheel is clockwise when looking at arrow a Figure 8, and this will cause the wheel to grind the edge with the grain of the teeth. The wheel is moved entirely across the saw E during the grinding movement.

The operator now moves the grinding head so that the wheel Y will cut across the saw. The bevel edge 58 of the wheel Y will grind the rake side of an adjacent tooth J'. The wheel Y is rotating in a counter-clockwise direction when looking at Figure 8, see arrow b, and therefore the lower portion of the wheel that grinds the saw will be cutting with the grain of the saw. In actual practice, the wheel Y rotates in a reverse direction to the wheel X. It will be seen from Figure 5 that the edge 58 of the wheel Y will contact only with the rake edge 59 of the tooth J' and will not touch the edge 57 of the tooth J, because the bevel angle of the wheel is less than the 60° angle between the teeth. In like manner the bevel edge 56 of the wheel X will contact with the edge 57 of the tooth J and will not contact with the rake edge 59 of the tooth J'. The faces of the wheels do not contact with any edges of the teeth, because the bevel of the wheels is less than 60° or about 45°. This is a very important point because the grinding action of both wheels when contacting with the saw will be only in the direction of the grain of the saw and not against the grain.

The set screw 23 will be adjusted so that each time the foot treadle 30 is depressed the saw will be advanced the distance of two teeth. The details of the saw-advancing mechanism have been described and they need not be repeated. Usually a crown effect is given to a saw during the grinding of the teeth. In Figure 2 the dot and dash line 60 along the top of the saw is a straight line, while an arcuate line 61 is shown extending from end to end of the saw. The shims 7 which raise the centers of the rods 10 will cause the traveling holder D for the saw to move through an arc so that the row of teeth ground in the saw will take the form of an arc following the line 61 rather than take the form of the straight line 60.

Reference to Figure 2 shows the traveling holder D positioned at the right hand ends of the rods 10. As the holder is advanced along the rods step-wise, the end brackets 11 will start to move downwardly along the slightly inclined rod portions 10, while the other end bracket 12 will move upwardly toward the high center points of the rods. This movement results in the saw E being gradually lowered as it is moved longitudinally along the rods until the end bracket 11 is positioned midway between the bracket 9 of the set-up frame C and the central bracket 62 of the set-up frame. When the end bracket 11 is thus positioned, the other end bracket 12 will be positioned midway between the center bracket 62 and the opposite end bracket 9. Further longitudinal movement of the traveling holder D to the left in Figure 2 will cause the end bracket 11 of the holder to continue to drop, while the end bracket 12 will continue to rise. The result of these two movements will cause the saw E to have its right hand portion gradually raised so that the grinding wheels X and Y will grind the teeth in such a manner that the row of teeth will be in the shape of an arc. This gives the necessary crown effect to the row of saw teeth.

After the saw has been step-wise advanced throughout its length and the wheels X and Y have been alternately used for grinding the bevelled edges 57 and 59 on the teeth J and J', the saw is moved into its right hand position as shown in Figure 2 and is placed between the grinding wheels Y and Z as shown by the dotted line position E' in Figure 8. The turntable is swung clockwise to move the saw into the new position. The two wheels Y and Z will now be alternately moved across the saw to grind the edges of alternate teeth that have not been ground in the previous operation. The grinding wheel Y will grind the rake edge of the tooth and the grinding action will be in the same direction as the grain of the saw. To accomplish this, the motor H is reversed in its rotation and the wheel Y will be reversed in its rotation so that its lower portion that contacts with the saw will be moving in the direction of the saw blade, note dotted arrow c.

After the grinding head F has been moved for carrying the wheel Y past the saw E', the grinding head is reversed in its movement for bringing the grinding wheel Z into contact with the saw. The wheel Z will be rotated in a counter-clockwise direction when looking at the arrow d in Figure 8 so that its lower edge will be moving toward the saw as the wheel passes it. The bevel edge 63 of the grinding wheel Z will grind the back of the saw tooth edge corresponding to the edge 57 in Figure 5. The traveling holder D will be step-wise advanced so that every other tooth will be brought into a position to be contacted by the wheels Y and Z. The grinding operation completes the grinding of the saw teeth.

If desired, the grinding head F may carry a saw punch, not shown, and a saw set, not shown. With these two additional mechanisms mounted on the grinding head, the punching, grinding and setting of the saw teeth can be accomplished with the same machine.

Where a different rake angle is to be made in the saw, the sliding ways G can be swung about their pivots 39 and 40 into the desired angular position. When this position is reached, the clamping bolts 41 and 42 may be tightened. I show in Figure 6 the grinding wheels X and Y swung into a different position for grinding the teeth on the saw. The operation is identical to that already described and no further description need be given. It is possible to grind the teeth of rip or crosscut saws by merely changing the rake angle of the slide ways G and thus changing the angle of the grinding head F. Since the slide ways rotate about the pivot line 44, the lower edges of the grinding wheels X, Y and Z will also pivot about the same line. This is an important feature of my invention.

I claim:

1. A saw tooth grinder comprising a horizontal platform; a turntable swingably mounted on the platform; a set-up frame carried by the turntable; a saw traveling holder slidable on the frame and supporting a saw so that its plane is in a vertical position, the holder moving the saw through the vertical pivot axis of the turntable, a sliding ways extending transversely across the platform; brackets on the platform for pivotally supporting the sliding ways so that it can be swung about a horizontal axis that passes through said vertical axis; means for securing the sliding ways in the desired angular position; the traveling holder supporting the saw so that the roots of the saw teeth will pass through the horizontal pivot axis of the sliding ways, a saw grinding head slidable on the sliding ways and having grinding wheels, the saw engaging portions of the grinding wheels lying in the horizontal pivot axis, and means for rotating the wheels for causing the saw engaging portions to move with the grain of the saw when the grinding head is moved for moving the desired wheel across the saw for grinding a tooth edge.

2. A saw tooth grinder comprising a horizontal platform, a turntable swingably mounted on the platform, a set-up frame carried by the turntable, a saw traveling holder slidable on the frame and supporting a saw so that its plane is in a vertical position, the holder moving the saw through the vertical pivot axis of the turntable, a sliding ways extending transversely across the platform, brackets on the platform for pivotally supporting the sliding ways so that it can be swung about a horizontal axis that passes through said vertical axis, means for securing the sliding ways in the desired angular position, the traveling holder supporting the saw so that the roots of the saw teeth will pass through the horizontal pivot axis of the sliding ways, a saw grinding head slidable on the sliding ways and having grinding wheels, the saw engaging portions of the grinding wheels lying in the horizontal pivot axis, and means for rotating the wheels for causing the saw engaging portions to move with the grain of the saw when the grinding head is moved for moving the desired wheel across the saw for grinding a tooth edge, and means for step-wise advancing the saw the distance of two teeth each time the means is actuated, said frame holding the saw at an angle with respect to the sliding ways so that the wheel will bevel the tooth edge contacted.

3. A saw tooth grinder comprising a horizontal platform, a turntable swingably mounted on the platform, a set-up frame carried by the turntable, a saw traveling holder slidable on the frame and supporting a saw so that its plane is in a vertical position, the holder moving the saw through the vertical pivot axis of the turntable, a sliding ways extending transversely across the platform, brackets on the platform for pivotally supporting the sliding ways so that it can be swung about a horizontal axis that passes through said vertical axis, means for securing the sliding ways in the desired angular position, the traveling holder supporting the saw so that the roots of the saw teeth will pass through the horizontal pivot axis of the sliding ways, a saw grinding head slidable on the sliding ways and having grinding wheels, the saw engaging portions of the grinding wheels lying in the horizontal pivot axis, and means for rotating the wheels for causing the saw engaging portions to move with the grain of the saw when the grinding head is moved for moving the desired wheel across the saw for grinding a tooth edge, and means for step-wise advancing the saw the distance of two teeth each time the means is actuated, said frame holding the saw at an angle with respect to the sliding ways so that the wheel will bevel the tooth edge contacted and means for giving a slight arc in a vertical plane to the traveling holder for causing the teeth to take a crown effect throughout the length of the saw.

4. In a saw tooth grinder, horizontally disposed sliding ways, a grinding head movable along the sliding ways, at least two grinding wheels rotatably carried by the grinding head, said wheels having bevelled rims whose lower edges lie tangent with a line that parallels the line of movement, means for rotating the wheels in opposite directions so that their lower portions will be moving toward each other, means for supporting a saw blade between the wheels so that the tangent line will cut across the line that coincides with the root of the saw teeth, the bevelled wheel rims being adapted to alternately grind the two edges forming a root between adjacent teeth, the bevel angle of the wheels being less than 60° which is the angle between adjacent teeth, the axis of one wheel extending at an angle with respect to the axis of the other wheel such that one wheel will contact with only one tooth edge at a time and will grind with the grain of the saw.

5. In a saw tooth grinder, horizontally disposed sliding ways, a grinding head movable along the sliding ways, at least two grinding wheels rotatably carried by the grinding head, said wheels having bevelled rims at less than 60° angles whose lower edges lie tangent with a line that parallels the line of movement, means for rotating the wheels in opposite directions so that their lower portions will be moving toward each other, means for supporting a saw blade between the wheels so that the tangent line will cut across the line that coincides with the root of the saw teeth, the bevelled wheel rims being adapted to alternately grind the two edges forming a root between adjacent teeth, the bevel angle of the wheels being less than 60° which is the angle between adjacent teeth, the axis of one wheel extending at an angle with respect to the axis of the other wheel such that one wheel will contact with only one tooth edge at a time and will grind with the grain of the saw, means for rockably supporting the sliding ways so that it can pivot about the line that is tangent with the wheel bottoms, whereby the sliding ways can be rocked into positions for causing the wheels to grind the teeth edges at the desired rake angles, and means for securing the sliding ways in adjusted position.

6. In a saw tooth grinder, horizontally disposed sliding ways, a grinding head movable along the sliding ways, at least two grinding wheels rotatably carried by the grinding head, said wheels having bevelled rims at less than a 60° angle whose lower edges lie tangent with a line that parallels the line of movement, means for rotating the wheels in opposite directions so that their lower portions will be moving toward each other, means for supporting a saw blade between the wheels so that the tangent line will cut across the line that coincides with the root of the saw teeth, the bevelled wheel rims being adapted to alternately grind the two edges forming a root between adjacent teeth, the axis of one wheel extending at an angle with respect to the axis of the other wheel, the bevel of the wheels being less than 60° angle whereby one wheel will contact with only one tooth edge at a time and will grind with the grain of the saw, and means for adjusting the saw blade support for holding the saw at the desired angle with respect to the said tangent line, whereby the wheels will grind the tooth edges at the desired bevel.

7. A saw tooth grinder comprising a horizontally disposed sliding ways, a grinding head slidable along the ways, three bevelled grinding wheels carried by the head and arranged in a row so that their lower edges will lie tangent to a line that parallels the sliding ways, the axes of the two end wheels lying in a plane so that the bevelled edges will grind only the back edge of the tooth it engages when the head is moved for causing the wheel to contact with a saw tooth, the axis of the middle wheel causing its bevelled edge to grind only the rake edge of the tooth it engages, the wheels being spaced apart so that only one wheel will contact the saw at a given time, and means for rotating the wheels so that the saw engaging portion will be cutting with the grain of the saw while contacting the saw.

8. A saw tooth grinder comprising a horizontally disposed sliding ways, a grinding head slidable along the ways, three bevelled grinding wheels carried by the head and arranged in a row so that their lower edges will lie tangent to a line that parallels the sliding ways, the axes of the two end wheels lying in a plane so that the bevelled edges will grind only the back edge of the tooth it engages when the head is moved for causing the wheel to contact with a saw tooth, the axis of the middle wheel causing its bevelled edge to grind only the rake edge of the tooth it engages, the wheels being spaced apart so that only one wheel will contact the saw at a given time, and means for rotating the wheels so that the saw engaging portion will be moving with the grain of the saw while contacting the saw and means for pivotally supporting the sliding ways so that it can be swung about said tangent line into the desired angular position for grinding the teeth at the desired rake angle.

9. A saw tooth grinder comprising a horizontally disposed sliding ways, a grinding head slidable along the ways, three bevelled grinding wheels carried by the head and arranged in a row so that their lower edges will lie tangent to a line that parallels the sliding ways, reversible means for rotating the outer wheels in one direction and the center wheel in an opposite direction, the portions of the end wheels that are tangent with said line, lying in the plane that extends at an angle of 60° with a plane that coincides with the lower bevel portion of the middle wheel that lies tangent to the same line, one end wheel and the center wheel being adapted to straddle a saw and adapted to alternately contact the saw when the head is reciprocated on the sliding ways, said wheel-rotating means causing the lower portions of said end wheel and center wheel to rotate toward the saw, the grinding head also being positionable so that the other end wheel and said center wheel will straddle the saw, the head being movable for alternately bringing these wheels into contact with the saw, said wheel rotating means being reversed for causing the last two mentioned wheels to be reversed in their rotation for causing them to grind the saw with the grain.

10. A saw tooth grinder comprising a grinding head, three bevelled grinding wheels rotatably carried by the head and arranged in a row so that the lower edges of the wheels will lie in a straight line, a reversible motor operatively connected to the wheels for rotating the end wheels in the same direction and the center wheel in the opposite direction, the lower bevelled edge of the center wheel making an angle of 60° with the lower bevelled edges of the two end wheels, the apex of the angle coinciding with said line, the wheels being spaced apart so that a saw blade can be received between either end wheel and the center wheel, the bevel of the wheels being less than a 60° angle so that only one tooth edge will be contacted by a wheel at any one time.

11. A saw tooth grinder comprising a grinding head, three bevelled grinding wheels rotatably carried by the head and arranged in a row so that the lower edges of the wheels will lie in a straight line, a reversible motor operatively connected to the wheels for rotating the end wheels in the same direction and the center wheel in the opposite direction, the lower bevelled edge of the center wheel making an angle of 60° with the lower bevelled edges of the two end wheels, the apex of the angle coinciding with said line, the wheels being spaced apart so that a saw blade can be received between either end wheel and the center wheel the bevel of the wheels being less than a 60° angle so that only one tooth edge will be contacted by a wheel at any one time and sliding ways for slidably supporting the grinding head with respect to the saw.

12. A saw tooth grinder comprising a grinding head, three bevelled grinding wheels rotatably carried by the head and arranged in a row so that the lower edges of the wheels will lie in a straight line, a reversible motor operatively connected to the wheels for rotating the end wheels in the same direction and the center wheel in the opposite direction, the lower bevelled edge of the center wheel making an angle of 60° with the lower bevelled edges of the two end wheels, the apex of the angle coinciding with said line, the wheels being spaced apart so that a saw blade can be received between either end wheel and the center wheel, the bevel of the wheels being less than a 60° angle so that only one tooth edge will be contacted by a wheel at any one time and sliding ways for slidably supporting the grinding head with respect to the saw, brackets for pivotally supporting the sliding ways at points coinciding with said line whereby the wheels will remain tangent to the line during the swinging movement of the sliding ways, and means for securing the sliding ways in adjusted position.

13. A saw tooth grinder comprising a grinding head, three bevelled grinding wheels rotatably carried by the head and arranged in a row so that the lower edges of the wheels will lie in a straight line, a reversible motor operatively connected to the wheels for rotating the end wheels in the same direction and the center wheel in the opposite direction, the lower bevelled edge of the center wheel making an angle of 60° with the lower bevelled edges of the two end wheels, the apex of the angle coinciding with said line, the wheels being spaced apart so that a saw blade can be received between either end wheel and the center wheel, the bevel of the wheels being less than a 60° angle so that only one tooth edge will be contacted by a wheel at any one time and sliding ways for slidably supporting the grinding head with respect to the saw, brackets for pivotally supporting the sliding ways at points coinciding with said line whereby the wheels will remain tangent to the line during the swinging movement of the sliding ways, and means for securing the sliding ways in adjusted position, means for supporting the saw so that the roots of the teeth will coincide with the line, said saw supporting means being swingable into angular positions for causing the saw to extend at an angle with respect to the wheels, whereby the wheels will grind the desired bevel on the tooth edges.

14. A saw tooth grinder comprising a grinding head, three bevelled grinding wheels rotatably carried by the head and arranged in a row so that the lower edges of the wheels will lie in a straight line, a reversible motor operatively connected to the wheels for rotating the end wheels in the same direction and the center wheel in the opposite direction, the lower bevelled edge of center wheel making an angle of 60° with the lower bevelled edges of the two end wheels, the apex of the angle coinciding with said line, the wheels being spaced apart so that a saw blade can be received between either end wheel and the center wheel, the bevel of the wheels being less than a 60° angle so that only one tooth edge will be contacted by a wheel at any one time and sliding ways for slidably supporting the grinding head with respect to the saw, brackets for pivotally supporting the sliding ways at points coinciding with said line whereby the wheels will remain tangent to the line during the swinging movement of the sliding ways, and means for securing the sliding ways in adjusted position, means for supporting the saw so that the roots of the teeth will coincide with the line, said saw supporting means being swingable into angular positions for causing the saw to extend at an angle with respect to the wheels, whereby the wheels will grind the desired bevel on the tooth edges and means associated with the saw supporting means for step-wise advancing the saw two teeth at a time.

15. In a grinder for sharpening teeth of a saw blade, a clamp for supporting a saw, and means for grinding the back of one tooth with the grain of the saw blade, the grinding movement being toward the cutting edge of that tooth and in a direction toward one side of the saw blade, said means being reversible in its movement for grinding the rake of the adjacent tooth with the grain and toward the cutting edge of the rake, the latter grinding movement being toward the opposite side of the saw blade.

MARTIN H. WILBERT.

REFERENCES CITED

The following references are of record in the file of this patent:

UNITED STATES PATENTS

| Number | Name | Date |
|---|---|---|
| 1,732,132 | Marshall | Oct. 15, 1929 |
| 378,277 | Amesbury | Feb. 21, 1888 |
| 2,067,179 | Elder | Jan. 12, 1937 |
| 62,705 | Tuder | Mar. 5, 1867 |